(12) United States Patent
Mollhagen

(10) Patent No.: US 7,770,542 B2
(45) Date of Patent: Aug. 10, 2010

(54) APPARATUS FOR SECURING LIVESTOCK

(76) Inventor: Jon Davis Mollhagen, P.O. Box 80, Lorraine, KS (US) 67459

( * ) Notice: Subject to any disclaimer, the term of this patent is extended or adjusted under 35 U.S.C. 154(b) by 0 days.

(21) Appl. No.: 12/214,311

(22) Filed: Jun. 18, 2008

(65) Prior Publication Data

US 2008/0308047 A1    Dec. 18, 2008

Related U.S. Application Data

(60) Provisional application No. 60/936,029, filed on Jun. 18, 2007.

(51) Int. Cl.
*A01K 15/04* (2006.01)
(52) U.S. Cl. .................. 119/734; 119/752
(58) Field of Classification Search ............ 119/731, 119/734, 735, 729, 730, 737, 752
See application file for complete search history.

(56) References Cited

U.S. PATENT DOCUMENTS

| | | | |
|---|---|---|---|
| 2,703,554 A | 3/1955 | Haggard et al. | |
| 3,099,249 A | 7/1963 | Newhouse | |
| 4,100,886 A * | 7/1978 | Wade et al. | 119/730 |
| 4,302,908 A | 12/1981 | Parker | |
| 4,304,195 A | 12/1981 | Christophersen | |
| 4,517,924 A | 5/1985 | McCan et al. | |
| 4,579,084 A * | 4/1986 | McCan et al. | 119/731 |
| 4,702,200 A | 10/1987 | Simington | |
| 4,892,062 A | 1/1990 | Elford | |
| 4,892,203 A | 1/1990 | Arav | |
| 5,065,701 A * | 11/1991 | Punt | 119/729 |
| 5,111,773 A | 5/1992 | Akins | |
| 5,158,041 A * | 10/1992 | Schmitz | 119/751 |
| 5,263,438 A * | 11/1993 | Cummings | 119/734 |
| 5,331,923 A | 7/1994 | Mollhagen | |
| 5,375,560 A | 12/1994 | Paul et al. | |
| 5,908,009 A * | 6/1999 | Cummings | 119/734 |
| 6,158,393 A | 12/2000 | Trethewey | |
| 6,536,375 B2 | 3/2003 | Fergusson | |
| 6,609,480 B2 * | 8/2003 | Daniels et al. | 119/752 |
| 6,666,169 B2 * | 12/2003 | Dehod | 119/731 |
| 2003/0172881 A1 | 9/2003 | Dehod | |
| 2005/0132978 A1 | 6/2005 | Bentz | |

* cited by examiner

*Primary Examiner*—Michael R Mansen
*Assistant Examiner*—Brian M O'Hara
(74) *Attorney, Agent, or Firm*—Robert O. Blinn

(57) ABSTRACT

An improved squeeze chute includes opposing neck bar assemblies. Each neck bar assembly is mounted to a head door of a cattle chute of the type where the head doors pivot in unison between open and closed positions. Each neck bar assembly may be independently actuated to move the neck bar from a first position close to the head door and separated from the center line of the squeeze chute to a second position spaced away from the squeeze chute and closer to the center line of the squeeze chute.

11 Claims, 8 Drawing Sheets

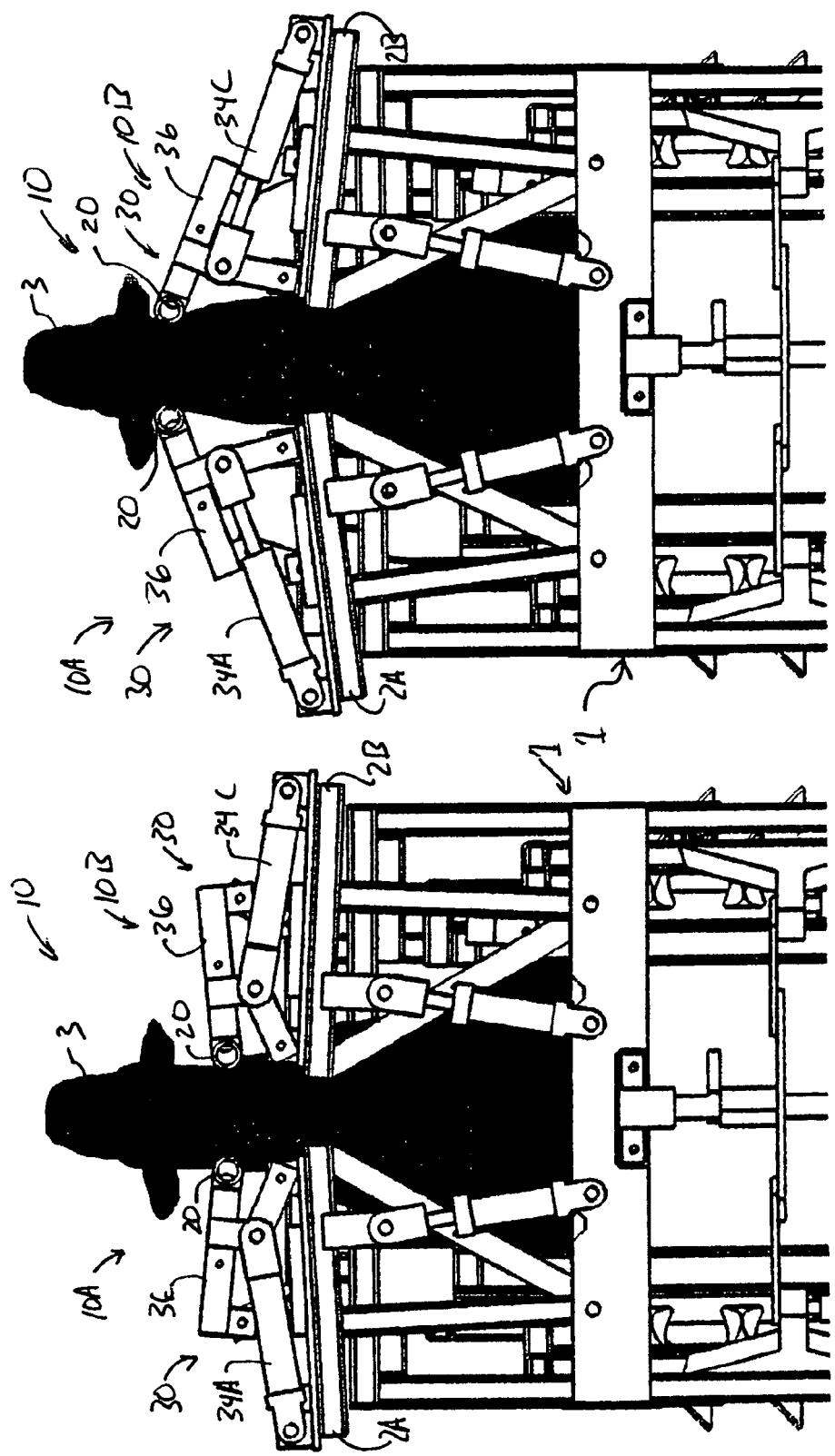

APPARATUS FOR SECURING LIVESTOCK

CROSS REFERENCES TO RELATED APPLICATIONS

This application claims the benefit of U.S. Provisional Patent Application No. 60/936,029 filed Jun. 18, 2007, which is incorporated herein by reference.

FIELD OF THE INVENTION

The present invention relates to an apparatus for securing the head and neck of a livestock animal for veterinary procedures.

BACKGROUND OF THE INVENTION

Livestock animals, such as bovine cattle may be directed into a squeeze chute adapted for restraining the animal for the administration of veterinary procedures such as vaccinations. A difficulty that occurs in connection with such a squeeze chute process is that an animal will struggle and move its head and neck increasing the likelihood of injury to the animal and to animal care professionals administering to the animal. What is needed is an apparatus for safely securing the head and neck of a livestock animal while the livestock animal is retained in a squeeze chute.

SUMMARY OF THE INVENTION

The above described need is satisfied by an improved livestock squeeze chute. The squeeze chute is generally of the type having opposing pivoting side frames that pivot between a first open position and a second closed position for holding an animal. The forward end of the squeeze chute includes an exit gate having two head doors. Each head door is pivotably mounted to one of the pivoting side frames for movement between an open position and a closed position. An example of such a squeeze chute is taught and described by U.S. Pat. No. 5,331,923 which was issued to the applicant and is incorporated herein by reference as if repeated verbatim hereinafter. The head doors of the squeeze chute define an opening for receiving the neck of a livestock animal. The improvement of this squeeze chute includes two neck bar assemblies which are mounted to each of the head doors. Each of the neck bar assemblies includes at least one actuator mechanism and at least one neck member. Each actuator mechanism includes a mechanism for translating the neck bar member between a first position and a second position. When in the first position the neck bar is relatively close to the head door and generally spaced away from the opposite neck bar. When in the second position, the neck bar is spaced away from the front panel and closer to the opposite neck bar. When in the second position the opposing neck bars are sufficiently close to each other to grip the neck of a livestock animal. The hydraulic system for powering the neck bars includes a pressure release valve set at a maximum pressure corresponding to a maximum force applied by a neck bar that is safely below the threshold force required to injure an animal. The hydraulic system further allows independent actuation of each neck bar as well as simultaneous actuation so that the head of an animal may be turned to either side. The neck bar immobilizes the head of an animal so that an operator may access the animal's head or neck for such tasks as ear tagging, removing horns, treating pink eye or applying oral or nasal medications.

BRIEF DESCRIPTION OF THE DRAWINGS

FIG. 4A is a top view of the improved livestock squeeze chute with both neck bar assemblies in the first retracted position.

FIG. 4B is a top view of the improved livestock squeeze chute with both neck bar assemblies in the second extended position.

DETAILED DESCRIPTION

Figure 1:
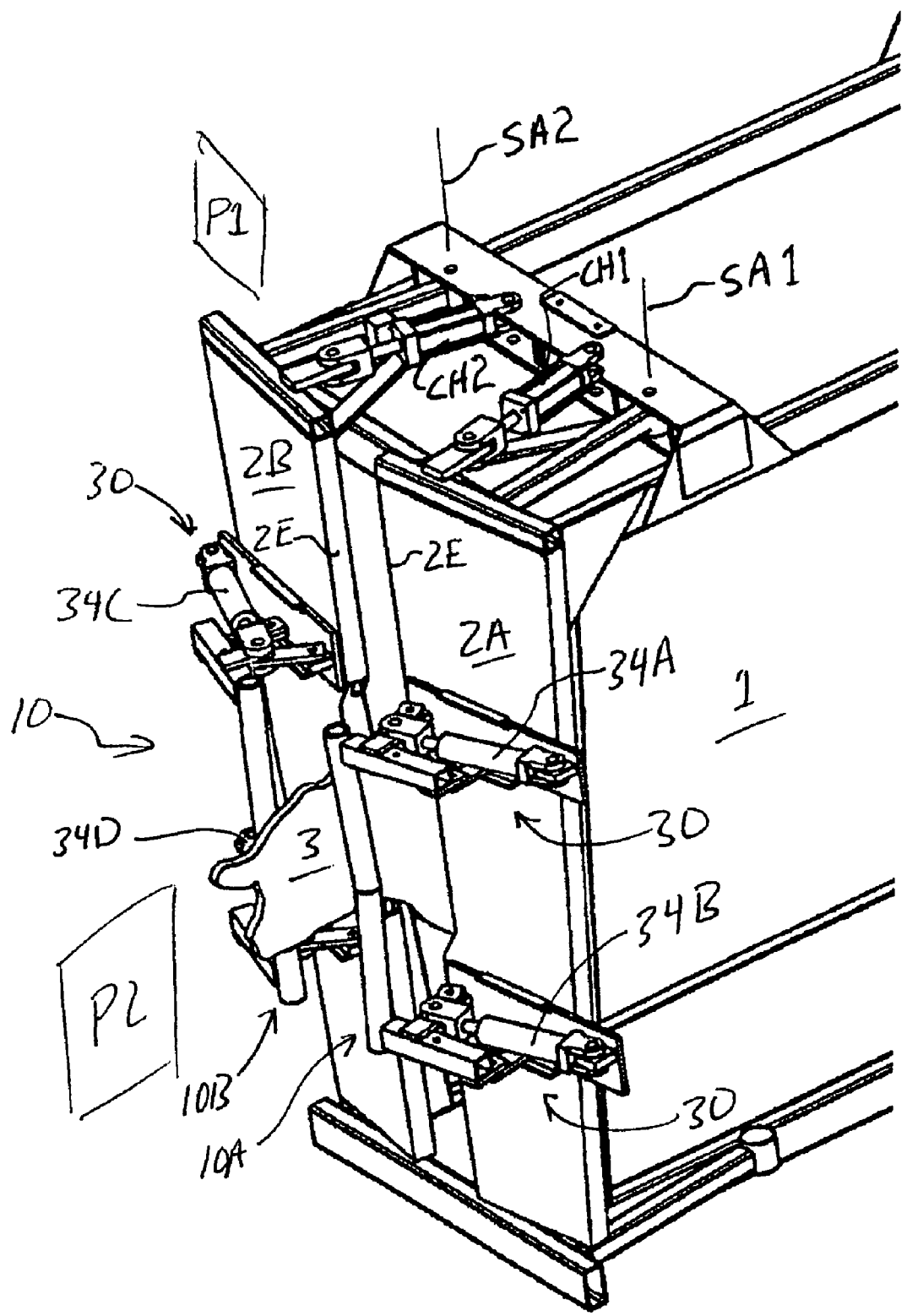
FIG. 1 is a perspective view of the improved livestock squeeze chute.
Figure 4C:
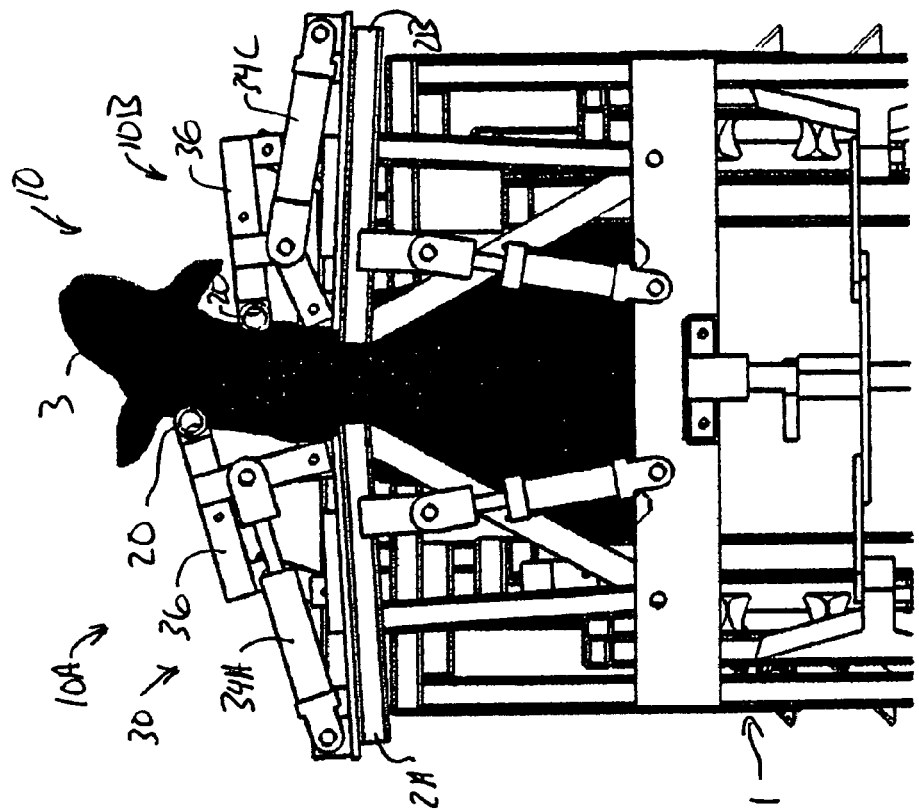
FIG. 4C is a top view of the improved livestock squeeze chute with the left neck bar assembly in the first retracted position and the right neck bar assembly in the second extended position for turning the animal's head to the left as viewed from the perspective of the figure.
Figure 4D:
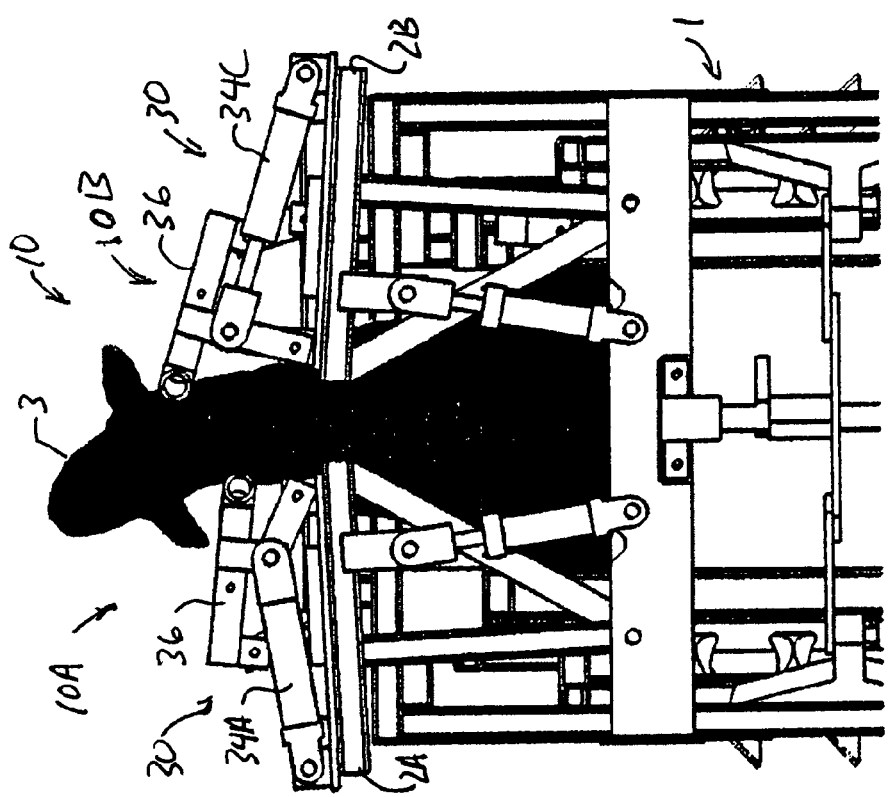
FIG. 4D is a top view of the improved livestock squeeze chute with the left neck bar assembly in the second extended position and the right neck bar assembly in the first retracted position for turning the animal's head to the right as viewed from the perspective of the figure.
Figure 4E:
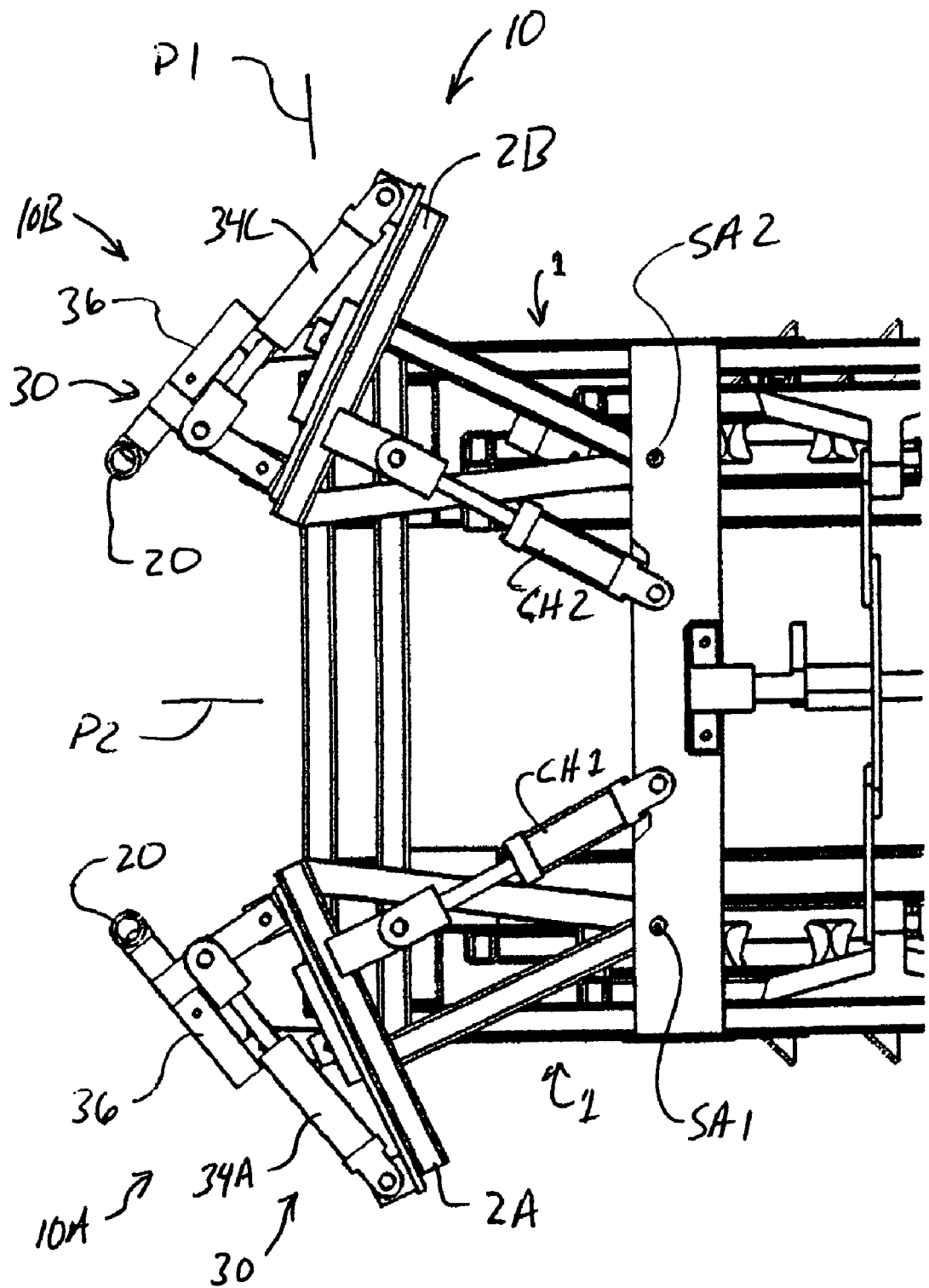
FIG. 4E is a top view of the improved livestock squeeze chute with both neck bar assemblies in the second extended position and with the head doors open and the animal released.

Referring to the drawings, FIG. 1 shows a squeeze chute 1 having pivotably mounted head doors 2A and 2B. Head doors 2A and 2B provide a head gate which may be closed by translating head doors 2A and 2B toward each other in order to retain an animal and which may be opened by translating head doors 2A and 2B away from each other in order to release an animal. Head doors 2A and 2B carry opposite and symmetrical portions of a neck bar installation 10 of the present invention. To understand the geometry of head doors 2A and 2B, the skilled reader should see that the forward surfaces of head doors 2A and 2B define relatively small acute angles with a head door transverse plane P1 when head doors 2A and 2B are in a closed position as shown in FIG. 1. A second longitudinal center plane P2 is generally perpendicular to plane P1 and is generally equidistant between head doors 2A and 2B as well as equidistant between the side walls of cattle chute 1. As can be seen in FIG. 1, head doors 2A and 2B pivot about generally upright axes SA1 and SA2 respectively by the action of hydraulic cylinders CH1 and CH2 respectively. Because axes SA1 and SA2 are generally upright and moderately spaced away from head doors 2A and 2B, head doors 2A and 2B will pivot away from animal 3 as they open. When hydraulic cylinders CH1 and CH2 are retracted as shown in FIG. 1, head doors 2A and 2B are in a closed position as shown in FIG. 1. Conversely, when hydraulic cylinders CH1 and CH2 are extended as shown in FIG. 4E, head doors 2A and 2B are in an open position thereby allowing the egress of an animal. When in the open position as shown in FIG. 4E, head doors 2A and 2B define a larger angle with respect to plane P1. Because axes SA1 and SA2 are generally upright and moderately spaced away from head doors 2A and 2B, head doors 2A and 2B pivot away from an escaping animal as the head doors swing open. (In U.S. Pat. No. 5,331,923 head doors 2A and 2B are referred to as exit gate side portions 85.)

As can be seen in FIG. 1, neck bar installation 10 includes a first neck bar assembly 10A mounted to head door 2A and a second, opposite and symmetrical neck bar assembly 10B mounted to head door 2B. For brevity and simplicity, the following description will consider the details of the neck bar assembly 10A which is mounted to head door 2A. The skilled reader will understand that the details of neck bar assembly 10A are repeated in an opposite and symmetrical manner in neck bar assembly 10B. As can be seen in FIG. 1, neck bar assembly 10A includes a neck bar 20, and upper and lower actuator mechanisms 30. The skilled reader should understand that upper and lower actuator mechanisms 30 are preferably identical and connected to the hydraulic system so that they operate in unison. Simultaneous operation is not necessarily the case for opposite neck bar assemblies 10A and 10B. As will be described in greater detail below, neck bar assemblies 10A and 10B may operate either independently or in unison at the discretion of the operator.

Figures 2A, 2B:
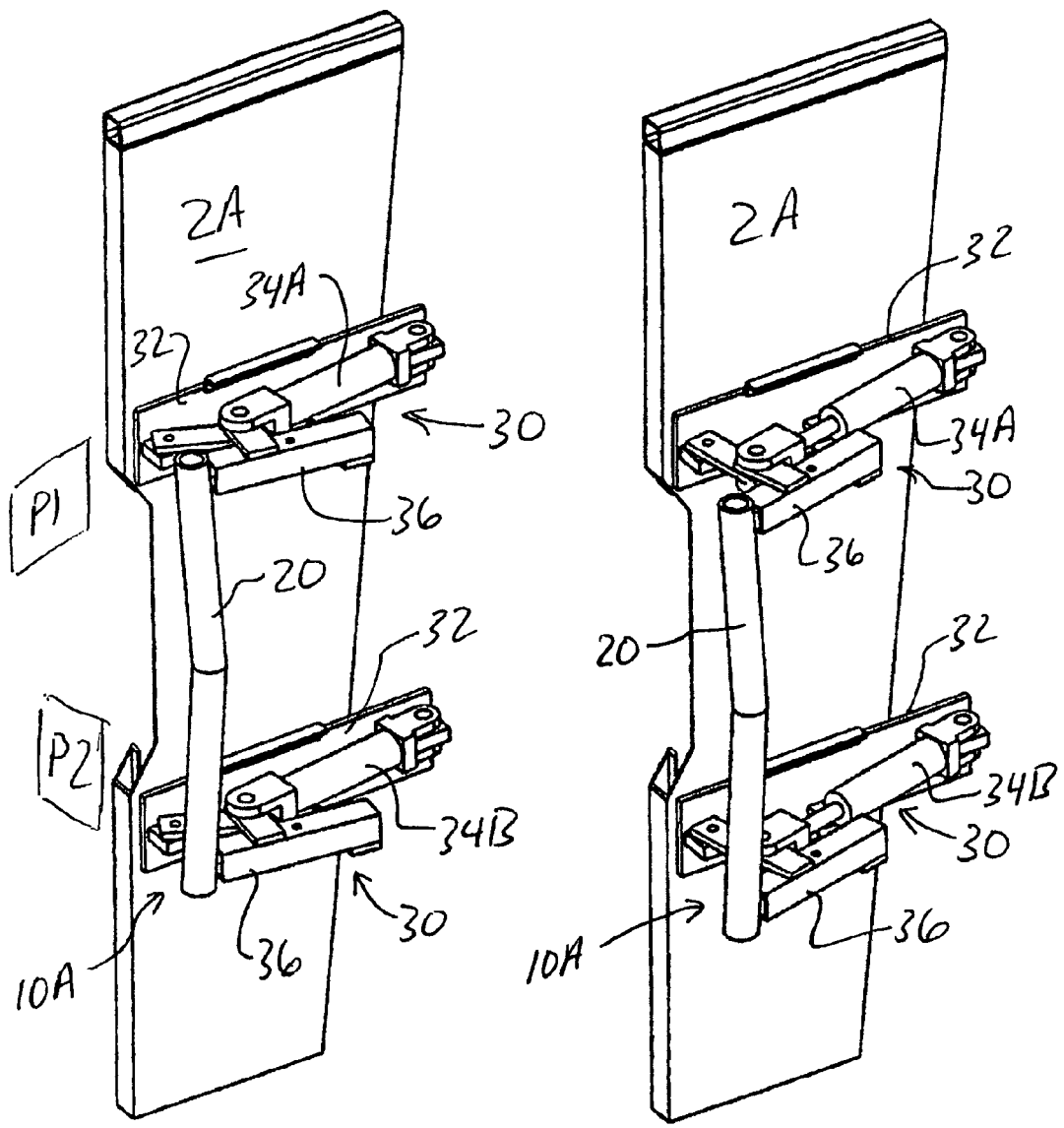
FIG. 2A is a perspective view of head door with a neck bar assembly in a first retracted position.
FIG. 2B is a perspective view of head door with a neck bar assembly in a second extended position.
Figure 3A:
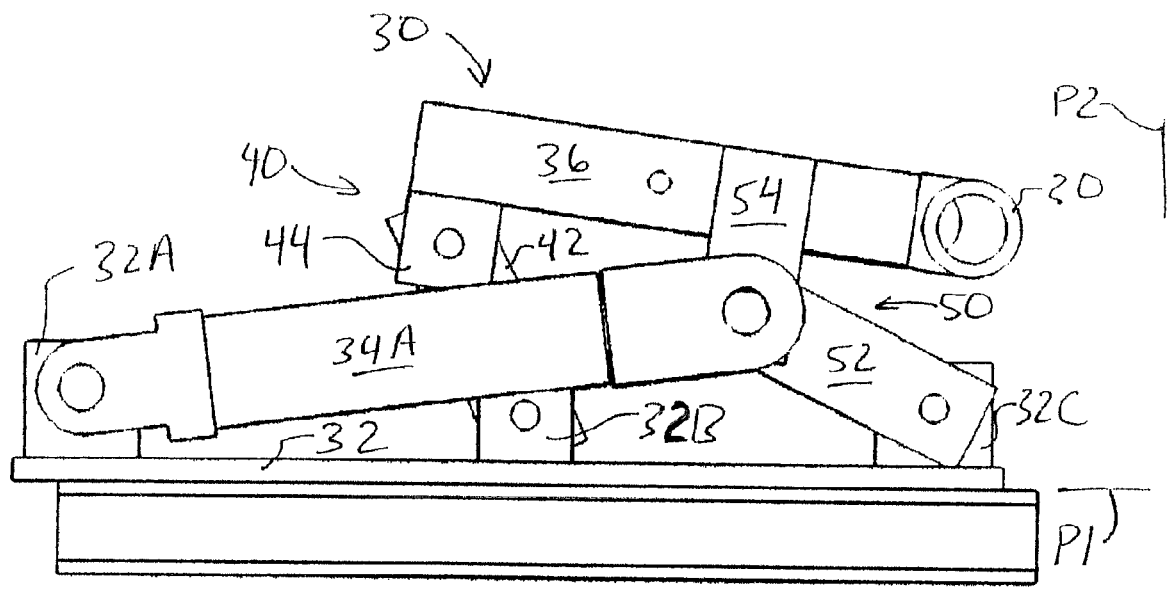
FIG. 3A is a top view of a neck bar assembly in a first retracted position.
Figure 3B:
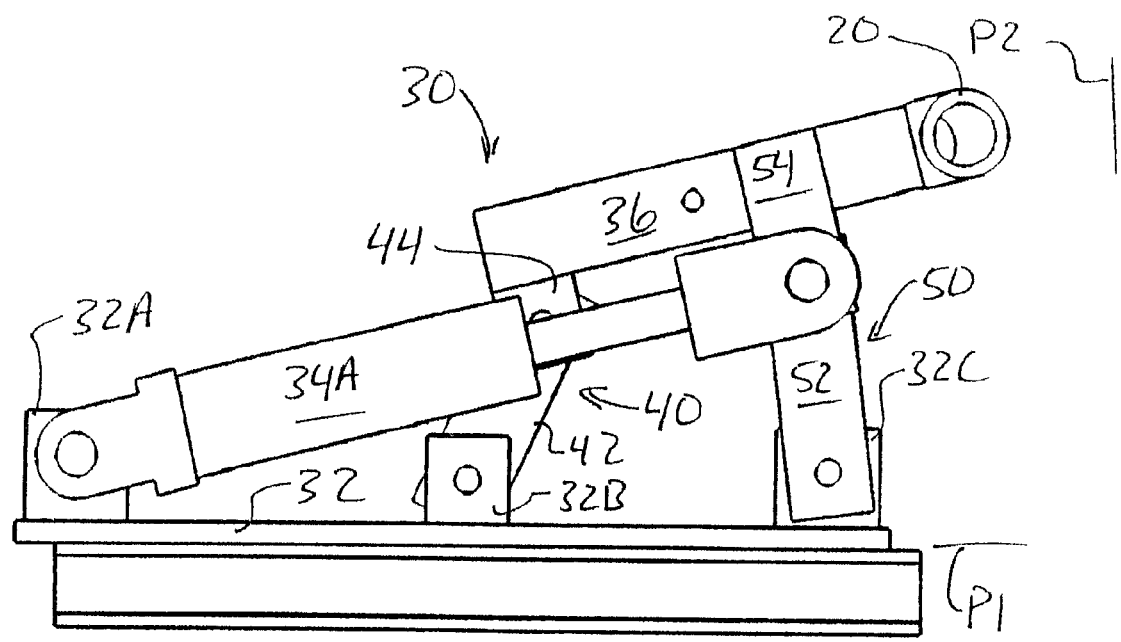
FIG. 3B is a top view of a neck bar assembly in a second extended position.

FIGS. 2A and 2B show neck bar assembly 10A mounted to head door 2A. Neck bar assembly 10A includes identical upper and lower actuator mechanisms 30. As can be seen in FIGS. 3A and 3B, each actuator mechanism 30 includes a base plate 32, a hydraulic cylinder 34A-D, a neck bar support member 36, an outside pivot linkage 40 and an inside pivot linkage 50. Although hydraulic cylinders 34A, 34B, 34C and 34D are differentiated below in the detailed description of the hydraulic circuit, they are represented here by hydraulic cylinder 34A. Base plate 32 is fixed to head door 2A. Base plate 32 carries three lugs for pivotably attaching the neck bar assembly, an outside lug 32A, a center lug 32B and an inside lug 32C. Outside pivot linkage 40 includes a first outside link 42 which is pivotably mounted at its proximate end to center lug 32B. A second outside link 44 is fixed to neck bar support member 36 at the end which is spaced away from neck bar 20. Second pivot link 44 is pivotably attached to the distal end of first outside link 42. A similar linkage is found on the inside end of actuator mechanism 30. Inside pivot linkage 50 includes a first inside link 52 which is pivotably mounted to inside lug 32C. A second inside link 54 is fixed to neck bar support member 36 at the end which is closest to neck bar 20. Second inside link 54 is pivotably attached to the distal end of first inside link 52. Hydraulic cylinder 34A is pivotably attached at its distal end to the joint between second inside link 54 and first inside link 52 and at its proximate end to outside lug 32A. Outside pivot linkage 50 and inside pivot linkage 40 are staggered on opposite sides of neck bar support member 36 to provide clearance for hydraulic cylinder 34A. When hydraulic cylinder 34A is retracted as shown in FIG. 3A, actuator mechanism 30 is in the first retracted position shown in FIGS. 2A and 3A wherein neck bar 20 is spaced away from plane P2 and relatively close to plane P1. When hydraulic cylinder 34A is extended as shown in FIG. 3B, actuator mechanism 30 is in the second extended position shown in FIGS. 2B and 3B 3A wherein neck bar 20 is relatively close to plane P2 and spaced farther away from plane P1 as compared to the retracted position.

As can be understood by reference to FIGS. 2A and 2B, the above described structure is preferably repeated in a generally identical fashion for upper actuator mechanism 30 and lower actuator mechanism 30. As can be seen in FIGS. 2A and 2B, upper actuator mechanism 30 and lower actuator mechanisms 30 are connected by a single neck bar 20 to complete neck bar assembly 10A. It is preferable that neck bar 20 is padded for the comfort of the animal. As can be seen in FIG. 1, neck bar assembly 10A is repeated in an opposite, symmetrical fashion by neck bar assembly 10B mounted to head door 2B as shown in FIG. 1. The skilled reader should note that hydraulic cylinder 34A is referred to above because the same mechanism is repeated at four locations to provide a complete neck bar installation 10. Hydraulic cylinder 34A is intended to represent four hydraulic cylinders, namely cylinders 34A, 34B, 34C, and 34D. The hydraulic cylinders are differentiated because they are all present in the hydraulic circuit which will be discussed below. The operation of these four hydraulic cylinders within the hydraulic circuit is discussed below in connection with FIG. 5. The above described structural components of neck bar assemblies 10A and 10B (such as base plates 32, pivot linkages 40 and 50 and neck bar support members 36) are preferably fashioned from plate or tubular steel as is best shown in FIGS. 2A and 2B.

As can be seen in FIGS. 3A and 3B, the elements of actuator mechanism 30 are preferably arranged so that, when in the first retracted position, neck bar 20 is located is a first position which is relatively close to base plate 32 and plane P1 and also spaced away from center plane P2. Accordingly, the first position may be characterized by the proximity of neck bar 20 to a head door or plane P1 and the transverse separation of neck bar 20 from the longitudinal center plane between head doors 2A and 2B. When in the second extended position, neck bar 20 is located in a second position which is relatively distant to base plate 32 and plane P1 and also relatively close to center plane P2. The second position may be characterized by the longitudinal separation of neck bar 20 from a head door or plane P1 and transverse proximity of neck bar 20 to the center longitudinal plane P2 between head doors 2A and 2B. When actuated in the extending motion, neck bar 20 moves forward and in from a position which is back and out, and when actuated in a retracting motion, neck bar 20 moves back and out from a position which is forward and in.

It is important in the operation of neck bar assemblies 10A and 10B that the respective hydraulic cylinders 34A and 34B of upper and lower actuator mechanisms 30 are operated simultaneously. Moreover, it is important that a pressure relief valve be included in the hydraulic circuit feeding hydraulic cylinders 34 so that the amount of force that may be applied by neck bar 20 to an animal be limited to an amount that is under a threshold for causing injury to the animal. The controls for controlling the supply of pressurized fluid to neck bar assembly 10A and neck bar assembly 10B may be adapted so that the neck bar assemblies may be moved in unison or independently. For example, neck bar assembly 10A may be fully extended while neck bar assembly 10B is partially extended in order to push the head of animal 3 shown in FIG. 1 toward the animal's right side. For example, an opposite control input would cause the full extension of neck bar assembly 10B and little or no extension of neck bar assembly 10A to cause the animal's head to be pushed to the animal's left side as shown in FIG. 4C. An opposite configuration wherein the animal's head is turned to the right may be accomplished as shown in FIG. 4D. The simultaneous extension of neck bar assemblies 10A and 10B will cause the animal's head to be extended in a forward direction as shown in FIG. 4B. If head doors 2A and 2B are closed sufficiently, neck bar assemblies 10A and 10B may be placed in the retracted position as shown in FIG. 4A in order to retain a relatively small animal or an animal with a relatively short neck. Thus, those skilled in the art may readily understand that with independent control of neck bar assemblies 10A and 10B as described above in combination with simultaneous control of head doors 2A and 2B, a range of head and neck positions suitable for veterinary operations may be accomplished by an operator having sufficient skill and practice.

The release of an animal from chute 1 is as important a step in the process as the capture and restraint of an animal. It is important that head doors 2A and 2B as well as neck bar assemblies 30 swing well clear of the released animal. A released animal may kick with its hind legs and if portions of a chute are in the path of a kicking hind leg, the animal may catch a hoof in the structure associated with the head doors thus breaking a leg and causing the destruction of the animal. Accordingly, head doors 2A and 2B and also by extension neck bar assemblies 30 are arranged so that they pivot about axis SA1 and SA2 as shown in FIG. 1. As shown in FIG. 4E, head doors 2A and 2B may be opened as they pivot in unison about axis SA1 and SA2 in order to release an animal. Because head doors 2A and 2B pivot about axis SA1 and SA1 the animal can easily escape from chute 1, even if both neck bar assemblies are in the extended position as shown in FIG. 4E. Thus, with this configuration, neck bar assemblies 30 do not have to be placed in a retracted position in order to safely release an animal.

Figure 5B:
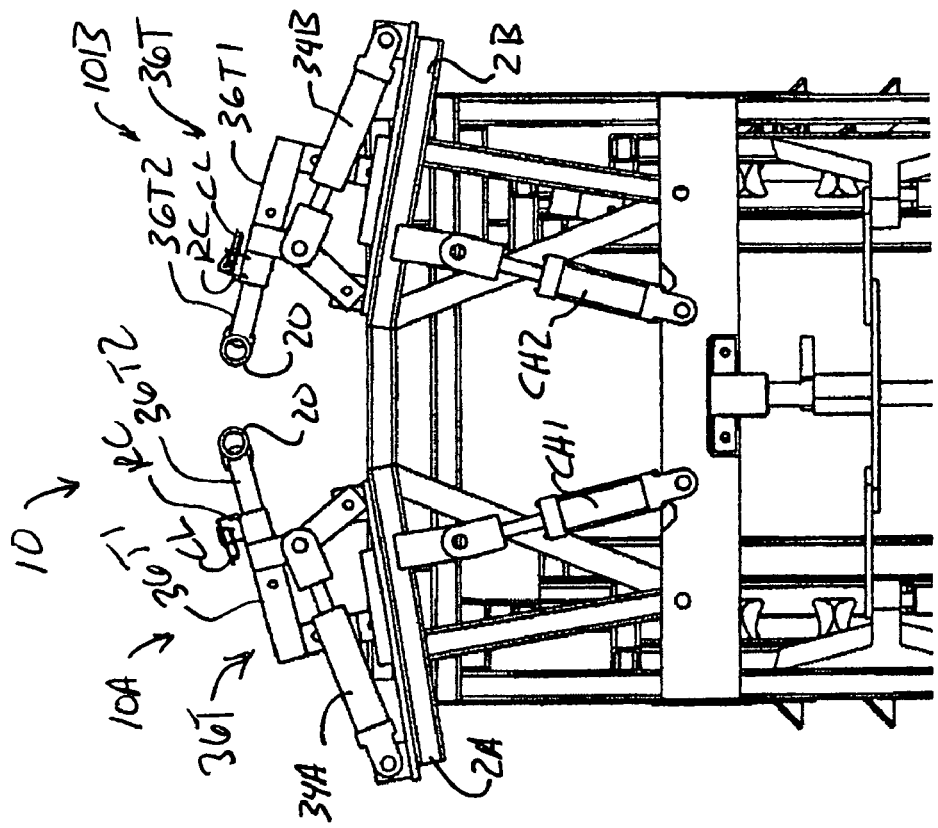
FIG. 5B is a top view of the improved livestock squeeze chute with both neck bar assemblies in the second extended position shown with an optional telescoping neck bar support member with the telescoping neck bar support member in a second extended position.
Figure 5A:
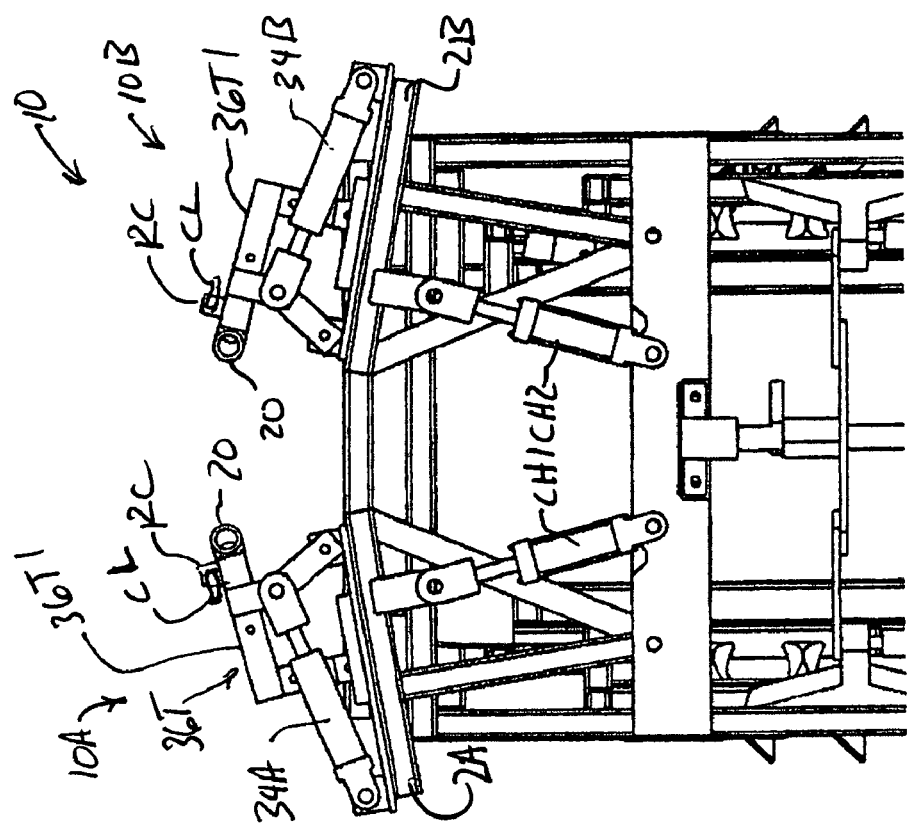
FIG. 5A is a top view of the improved livestock squeeze chute with the both neck bar assemblies in the second extended position shown with an optional telescoping neck bar support member with the telescoping neck bar support member in a first retracted position.

An optional additional means of adjustment may be added to neck bar assemblies 10A and 10B by replacing neck bar support members 36 with telescoping neck bar support members 36T as shown in FIGS. 5A and 5B. FIG. 5A shows telescoping neck bar support members 36T in a retracted position. FIG. 5B shows telescoping neck bar support members 36T in an extended position. This adjustment may be accomplished by any one of a number of ways. In this example, telescoping neck bar support members 36T include an outer tube 36T1 and an inner tube 36T2. Outer tube 36T1 includes a split ring clamp RC and a cam lever CL at its distal end adapted for locking and releasing split ring clamp RC. An operator may release cam lever CL and slide inner tube 36T2 to a desired position and then lock cam lever CL to clamp inner tube 36T2 in the selected position. Operators often work groups of animals of similar sizes, such as groups separated into calves and steers. Accordingly, the telescoping neck bar support members 36 may be adjusted to accommodate a first group of similarly sized animals and then readjusted to accommodate a second group of animals of a second different size from the first group.

Figure 6:
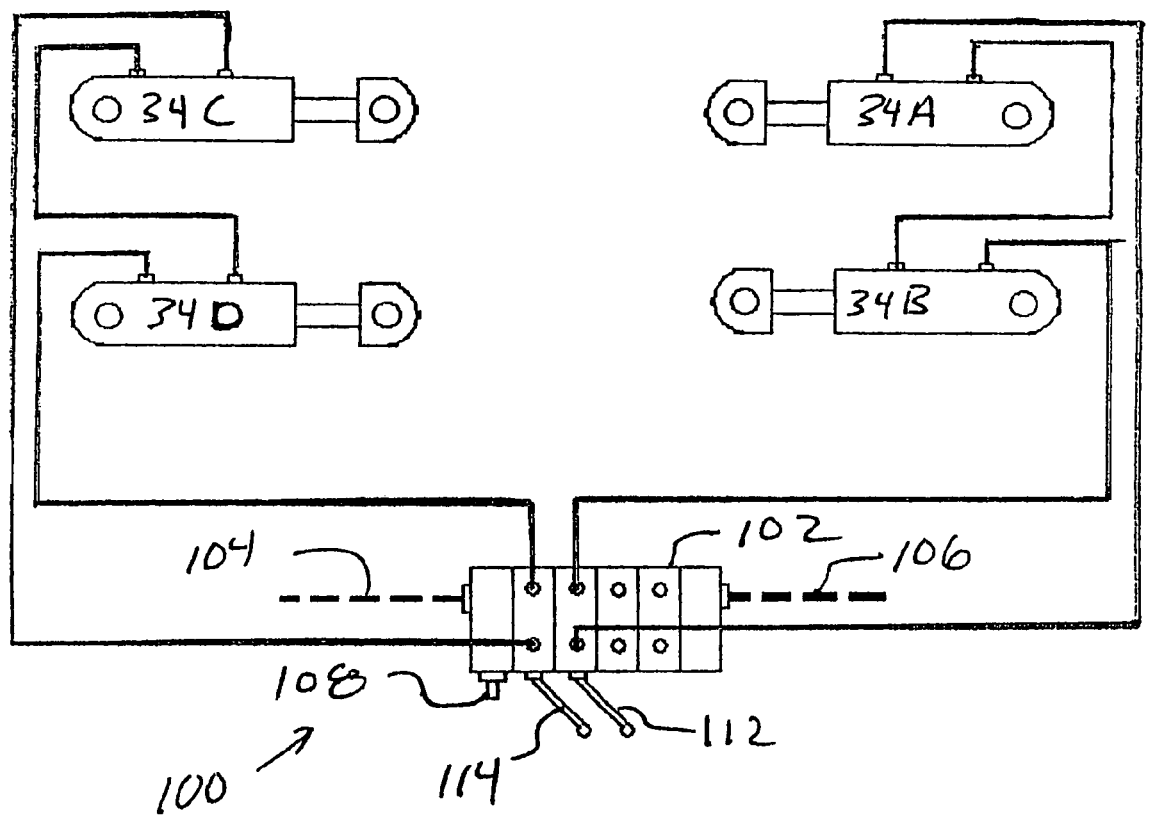
FIG. 6 is a schematic diagram of the hydraulic circuit which an operator uses to control the flow of hydraulic fluid to the hydraulic cylinders of the neck bar assemblies.

The various operations of neck bar installation 10 as described above are accomplished by means of hydraulic circuit 100 shown in FIG. 6. Hydraulic circuit 100 includes hydraulic cylinders 34A, 34B, 34C and 34D. The positions of hydraulic cylinders 34A, 34B, 34C and 34D within neck bar installation 10 are shown in FIG. 1. The relative positions of hydraulic cylinders 34A and 34B are shown in FIGS. 2A and 2B. As shown in FIG. 6, hydraulic circuit 100 includes a hydraulic control valve unit 102. Hydraulic control valve unit 102 is connected to a hydraulic system by pressure line 104 and a return line 106. A left side control valve 112 controls the operation of cylinders 34A and 34B. A right side control valve 114 controls the operation of cylinders 34C and 34D. An adjustable pressure relief valve 108 limits the amount of pressure that can be applied by cylinders 34A-34D. As can be seen in FIG. 6, cylinders 34A and 34B are placed in series so that the outlet of cylinder 34A communicates with the inlet of cylinder 34B. The same configuration is repeated for cylinders 34C and 34D. Accordingly, when control valve 112 is moved to a positive position, cylinders 34A and 34B extend simultaneously. Likewise, when control valve 112 is moved to a negative position, cylinders 34A and 34B retract simultaneously. When control valve 114 is moved to a positive position, cylinders 34C and 34D extend simultaneously. Likewise, when control valve 114 is moved to a negative position, cylinders 34C and 34D retract simultaneously. Control valves 112 and 114 are arranged such that they can be moved independently or simultaneously.

Accordingly, neck bar installation 10 meets the above described needs by providing a means for securing the head and neck of a livestock animal and securing the position of the head of a livestock animal for various livestock care operations as described above.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An improved squeeze chute for restraining a livestock animal, wherein the squeeze chute is of the type having a longitudinal center plane and opposing pivoting side frames that pivot between a first open position and a second closed position for holding an animal and two opposing forward head doors pivotably mounted to the forward ends of each of the side frames for pivoting in unison between an open position and a closed positions about generally upright axes of rotation which are spaced away from the head doors to cause the head doors to pivot away from an animal as they open, the head doors defining an opening for receiving the head and neck of a livestock animal, the improvement comprising;
   (a) first and second neck bar assemblies, the first neck bar assembly mounted to one of the head doors, the second neck bar assembly mounted to the opposite one of the head doors,
   (b) each of the neck bar assemblies including a neck bar, at least one pivot link pivotably connected at least indirectly between the head door and the neck bar, the at least one pivot link arranged such that the motion of the at least one pivot link occurs about a vertical axis, and an actuator operable for moving between a retracted position and an extended position which connects at least indirectly between the head door and the neck bar for movement of the neck bar relative to the head door, the actuator, the neck bar and the at least one pivot link arranged such that when the actuator is moved from the retracted position to the extended position, the neck bar moves between a first neck bar position and a second neck bar position, the first neck bar position characterized by proximity of the neck bar to the head door and transverse separation of the neck bar from the center plane of the squeeze chute, the second neck bar position characterized by longitudinal separation of the neck bar from the head door and transverse proximity of the neck bar to the center plane of the squeeze chute,
   the actuator mechanism of the first neck bar assembly and the actuator of the second neck bar assembly being operable in at least three modes: a first mode wherein, the neck bar of the first neck bar assembly remains in the first neck bar position as the neck bar of the second neck bar assembly moves from the first neck bar position to the second neck bar position, a second mode wherein, the neck bar of the second neck bar assembly remains in the first neck bar position as the neck bar of the first neck bar assembly moves from the first neck bar position to the second neck bar position, and a third mode wherein both neck bars move in unison between the first neck bar position and the second neck bar position.

2. The improved squeeze chute of claim 1, wherein;
each neck bar assembly includes a telescoping neck bar support member adapted for adjusting the transverse position of the neck bar with respect to the neck bar assembly.

3. The improved squeeze chute of claim 1, wherein;
each neck bar assembly includes upper and lower actuator mechanisms which operate in unison to move each neck bar between the first neck bar position and the second neck bar position.

4. The improved squeeze chute of claim 1, wherein;
the path of motion of each neck bar as each neck bar moves between the first neck bar position and the second neck bar position is characterized by greater longitudinal movement when the neck bar is near the first neck bar position and greater transverse movement when the neck bar is near the second neck bar position.

5. An improved squeeze chute for restraining a livestock animal, wherein the squeeze chute is of the type having a longitudinal center plane and opposing pivoting side frames that pivot between a first open position and a second closed position for holding an animal and two opposing forward head doors pivotably mounted to the forward ends of each of the side frames for pivoting in unison between an open position and a closed positions about generally upright axes of rotation which are spaced away from the head doors to cause the head doors to pivot away from an animal as they open, the head doors defining an opening for receiving the head and neck of a livestock animal, the improvement comprising;
(a) first and second neck bar assemblies, the first neck bar assembly mounted to one of the head doors, the second neck bar assembly mounted to the opposite one of the head doors,
(b) each of the neck bar assemblies including at least one actuator mechanism and a neck bar, each at least one actuator mechanism including a base plate fixed to the head door, a neck bar support member fixed to the neck bar, an outside pivot link pivotably connected between the base plate and the neck bar support member, the outside pivot link spaced away from the longitudinal center plane of the squeeze chute and arranged for motion about a vertical axis, an inside pivot link pivotably connected between the base plate and the neck bar support member, the inside pivot link disposed between the outside pivot link and the center plane of the squeeze chute and also arranged for motion about a vertical axis, and an actuator operable for moving between a retracted position and an extended position which connects at least indirectly between the base plate and the neck bar support member for movement of the neck bar relative to the base plate, the actuator, the inside pivot link and the outside pivot link arranged such that when the actuator is moved from the retracted position to the extended position, the neck bar moves between a first neck bar position and a second neck bar position, the first neck bar position characterized by proximity of the neck bar to the head door and transverse separation of the neck bar from the center plane of the squeeze chute, the second neck bar position characterized by longitudinal separation of the neck bar from the head door and transverse proximity of the neck bar to the center plane of the squeeze chute,
the actuator mechanism of the first neck bar assembly and the actuator of the second neck bar assembly being operable in at least three modes: a first mode wherein, the neck bar of the first neck bar assembly remains in the first neck bar position as the neck bar of the second neck bar assembly moves from the first neck bar position to the second neck bar position, a second mode wherein, the neck bar of the second neck bar assembly remains in the first neck bar position as the neck bar of the first neck bar assembly moves from the first neck bar position to the second neck bar position, and a third mode wherein both neck bars move in unison between the first neck bar position and the second neck bar position.

6. The improved squeeze chute of claim 5, wherein,
each neck bar assembly includes a telescoping neck bar support member adapted for adjusting the transverse position of the neck bar with respect to the neck bar assembly.

7. The improved squeeze chute of claim 5, wherein;
each neck bar assembly includes upper and lower actuator mechanisms which operate in unison to move each neck bar assembly between the first neck bar position and the second neck bar position.

8. The improved squeeze chute of claim 5, wherein;
the path of motion of each neck bar as each neck bar moves between the first neck bar position and the second neck bar position is characterized by greater longitudinal movement when the neck bar is near the first neck bar position and greater transverse movement when the neck bar is near the second neck bar position.

9. An opposing pair of head doors for a live stock squeeze chute, the head doors being movable between open and closed positions;
each head door including a neck bar assembly mounted thereon, each neck bar assembly including a neck bar structure that presents a neck bar for engaging the neck of a livestock animal, a pivotally mounted actuator connecting at least indirectly between the head door and the neck bar structure and at least one pivot link pivotably connecting at least indirectly between the head door and the neck bar structure, the motion of the at least one pivot link occurring about a vertical axis so that the neck bar translates in a non-linear manner between a first retracted neck bar position and a second extended neck bar position,
the actuator assembly for each neck bar having the movement thereof controlled by a controller that provides three modes of operation, a first mode wherein the neck bar on one head door remains in a first neck bar position as the neck bar on the other head door moves from a first neck bar position toward a second neck bar position, a second mode wherein the neck bar on the other head door remains in the first neck bar position as the neck bar on the one head door moves from a first neck bar position toward a second neck bar position, and a third mode wherein both neck bars on each of the head doors move in unison between first and second neck bar positions.

10. The head doors as in claim 9 wherein the neck bars are incrementally movable through a range of motion between the refracted neck bar position and extended neck bar position.

11. The head doors as in claim 9 wherein the neck bar assembly further includes an outer end assembly that is adjustably connected thereto so that the neck bar is incrementally movable away from and toward the remainder of the neck bar structure and fixed at a desired position.

* * * * *